United States Patent
Sakata et al.

(10) Patent No.: US 8,825,252 B2
(45) Date of Patent: Sep. 2, 2014

(54) VEHICLE AND CONTROL METHOD THEREFOR

(75) Inventors: Koichi Sakata, Okazaki (JP); Tomoko Shimana, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/879,419

(22) PCT Filed: Oct. 20, 2011

(86) PCT No.: PCT/IB2011/002499
§ 371 (c)(1),
(2), (4) Date: Apr. 15, 2013

(87) PCT Pub. No.: WO2012/056284
PCT Pub. Date: May 3, 2012

(65) Prior Publication Data
US 2013/0204477 A1  Aug. 8, 2013

(30) Foreign Application Priority Data

Oct. 25, 2010 (JP) ................................ 2010-238928
Feb. 21, 2011 (JP) ................................ 2011-034249

(51) Int. Cl.
*B60L 3/00* (2006.01)
(52) U.S. Cl.
USPC .......................... 701/22; 180/65.21; 903/903

(58) Field of Classification Search
USPC .......................... 701/22; 180/65.21; 903/903
See application file for complete search history.

(56) References Cited

U.S. PATENT DOCUMENTS

| | | | | |
|---|---|---|---|---|
| 5,816,358 A | * | 10/1998 | Adler et al. | 180/279 |
| 2009/0195199 A1 | * | 8/2009 | Ito | 318/400.22 |
| 2013/0049665 A1 | * | 2/2013 | Oyobe et al. | 318/489 |

FOREIGN PATENT DOCUMENTS

| | | | | |
|---|---|---|---|---|
| EP | 2075907 A1 | * 4/2005 | | H02P 27/06 |
| JP | 2005-020952 A | 1/2005 | | |
| JP | 2007 116790 A | * 5/2007 | | B60L 9/18 |
| JP | 2008-054420 A | 3/2008 | | |
| JP | 2010-004668 A | 1/2010 | | |
| JP | 2011-223705 A | 11/2011 | | |

* cited by examiner

*Primary Examiner* — Mary Cheung
*Assistant Examiner* — Brian P Sweeney
(74) *Attorney, Agent, or Firm* — Sughrue Mion, PLLC (57) ABSTRACT

After a collision has been detected, all the upper arm transistors of inverters (41, 42) are turned off, and all the lower arm transistors of the inverters are turned on. Then, when no counter electromotive force is generated in any one of motors (MG1, MG2), a gate voltage (V2) lower than a gate voltage (V1) at which each upper arm transistor completely turns on is applied to at least any one of the upper arm transistors of the inverters (41, 42), and at least any one of the lower arm transistors of the inverters (41, 42), which is serially connected to the at least any one of the upper arm transistors to which the gate voltage (V2) is applied, is turned on.

3 Claims, 6 Drawing Sheets

VEHICLE AND CONTROL METHOD THEREFOR

BACKGROUND OF THE INVENTION

1. Field of the Invention

The invention relates to a vehicle that includes a three-phase alternating-current motor, an electrical storage unit that is able to exchange electric power with the three-phase alternating-current motor via an inverter, a smoothing capacitor that smoothes voltage between the inverter and the electrical storage unit and a collision detecting unit that detects a collision of the vehicle, and also to a control method for the vehicle.

2. Description of Related Art

There is suggested a vehicle of this type, which includes a motor generator, an inverter circuit that drives the motor generator, a secondary battery unit that supplies electric power to the inverter circuit via a system main relay, a high-voltage capacitor that is provided between the system main relay and the inverter circuit and a radar sensor that measures the relative speed between an obstacle and the vehicle and the distance between the obstacle and the vehicle (for example, see Japanese Patent Application Publication No. 2005-20952 (JP-A-2005-20952)). In this vehicle, when a collision of the vehicle is predicted on the basis of information from the radar sensor, the system main relay is turned off, the inverter circuit is controlled so as to discharge the electric charge remaining in the high-voltage capacitor using coils of the respective phases of the motor generator while torque is not generated from the motor generator. In addition, there is suggested a vehicle of this type, which includes a motor generator, an inverter that has pairs of serially connected upper arm transistor and lower arm transistor and that drives the motor generator and a capacitor that is provided between a direct-current power supply and the inverter, and in which, when there occurs a short-circuit failure in any one of the upper arm and lower arm transistors of the inverter, the vehicle is caused to stop running, and the upper arm or lower arm transistor serially connected to the upper arm or lower arm transistor that has a short-circuit failure is turned on to fix the upper and lower arms of the short-circuit phase in a conductive state to thereby consume the electric charge stored in the capacitor as a short-circuit current (for example, see Japanese Patent Application Publication No. 2008-54420 (JP-A-2008-54420)). In this vehicle, when there occurs a short-circuit failure in the inverter as described above, the upper and lower arms of the short-circuit phase are fixed in a conductive state to form a path that passes current, in addition to a closed circuit between the motor generator and the inverter, to thereby prevent an overcurrent state of the inverter or conductive line even when large counter electromotive force is continuously generated in the motor generator, for example, while the vehicle is being towed.

Incidentally, in a vehicle of this type, when a collision actually occurs, the electric charge stored in the capacitor between the direct-current power supply and the inverter should be promptly discharged in terms of ensuring safety. However, when the upper and lower arms of the inverter are fixed in a conductive state after occurrence of a collision of the vehicle by applying the invention described in JP-A-2008-54420, large current flows through the upper and lower arms fixed in a conductive state, so there is a concern that the transistors may be adversely influenced. Furthermore, when counter electromotive force is generated in the motor generator, current discharged from the capacitor and current resulting from the counter electromotive force flow at the same time, so there is a concern that the transistors may be adversely influenced. In addition, when current resulting from the counter electromotive force is returned to the motor generator via the inverter and half-wave current flows through the phases of the motor generator, a permanent magnet of the motor generator may possibly be demagnetized.

SUMMARY OF THE INVENTION

The invention provides a vehicle that, in the event of a collision, promptly discharges the electric charge stored in a smoothing capacitor while further appropriately protecting an inverter and a three-phase alternating-current motor.

A first aspect of the invention relates to a vehicle. The vehicle includes: a three-phase alternating-current motor; an inverter that includes a plurality of upper arm transistors, each of which tends to reduce its resistance as an input voltage increases and turns on when an input voltage higher than a predetermined value is applied, a plurality of lower arm transistors, each of which is serially connected to a corresponding one of the upper arm transistors, and a plurality of diodes, each of which is connected in antiparallel with a corresponding one of the upper arm transistors and the lower arm transistors; an electrical storage unit that is able to exchange electric power with the three-phase alternating-current motor via the inverter; a smoothing capacitor that smoothes a Voltage between the inverter and the electrical storage unit; a control unit that controls the inverter; and a collision detecting unit that detects a collision, wherein the control unit turns off all the upper arm transistors of the inverter and turns on all the lower arm transistors of the inverter after the collision detecting unit has detected a collision, and then, when no counter electromotive force is generated in the three-phase alternating-current motor, the control unit applies an input voltage lower than the predetermined value to at least any one of the upper arm transistors of the inverter, and turns on at least any one of the lower arm transistors, which is serially connected to the at least any one of the upper arm transistors to which the input voltage lower than the predetermined value is applied.

According to the above aspect, after the collision detecting unit has detected a collision, all the upper arm transistors of the inverter are turned off, and all the lower arm transistors of the inverter are turned on. By so doing, when counter electromotive force is generated in the three-phase alternating-current motor after the collision detecting unit has detected a collision, current resulting from the counter electromotive force flows through the lower arm transistors and diodes of the inverter while being substantially equally distributed. Thus, current is prevented from concentratively flowing through a single lower arm transistor to thereby make it possible to protect the lower arm transistors, and half-wave current is not caused to flow through the phases of the three-phase alternating-current motor to thereby make it possible to prevent demagnetization of the permanent magnet of the three-phase alternating-current motor. In addition, when all the upper arm transistors are turned off and all the lower arm transistors are turned on, it is possible to prevent the upper arm transistors and lower arm transistors of the inverter from overheating because of current discharged from the smoothing capacitor and current resulting from the counter electromotive force, flowing at the same time. Note that, when counter electromotive force is generated in the three-phase alternating-current motor, torque in the direction to stop the rotation is generated in the three-phase alternating-current motor, and then no counter electromotive force is generated at the stage at which the rotation of the three-phase alternating-current motor has decreased to a certain degree because of the generated torque. In addition, as the collision detecting unit has detected a collision, all the upper arm transistors of the inverter are turned off, and all the lower arm transistors of the inverter are turned on. Then, when no counter electromotive force is generated in the three-phase alternating-current motor, an input voltage lower than the predetermined value is applied to at least any one of the upper arm transistors of the inverter, and at least any one of the lower arm transistors, which is serially connected to the at least any one of the upper arm transistors to which the input voltage lower than the predetermined value is applied, is turned on. In this way, the resistance of at least any one of the upper arm transistors of the inverter, to which the input voltage lower than the predetermined value is applied, is larger than the resistance of the at least any one of the upper arm transistors, which is completely turned on, and a current that flows through the at least any one of the upper arm transistors reduces. Thus, when the at least any one of the lower arm transistors, corresponding to the at least any one of the upper arm transistors to which the input voltage lower than the predetermined value is applied, is turned on, it is possible to promptly discharge the electric charge stored in the smoothing capacitor while preventing large current from flowing through these upper arm transistors and lower arm transistors. As a result, in the vehicle according to the aspect of the invention, it is possible to promptly discharge the electric charge stored in the smoothing capacitor while further appropriately protecting the inverter and the three-phase alternating-current motor in the event of a collision.

In addition, in the above aspect, the vehicle may include a plurality of the three-phase alternating-current motors and a plurality of the inverters, and the control unit may turn off all the upper arm transistors of the plurality of inverters and may turn on all the lower arm transistors of the plurality of inverters after the collision detecting unit has detected a collision, and then, when no counter electromotive force is generated in any one of the plurality of three-phase alternating-current motors, the control unit may apply an input voltage lower than the predetermined value to at least any one of the upper arm transistors included in at least any one of the plurality of inverters and may turn on at least any one of the lower arm transistors, which is serially connected to the at least any one of the upper arm transistors to which the input voltage lower than the predetermined value is applied.

In the vehicle according to the above aspect, after the collision detecting unit has detected a collision, all the upper arm transistors of the plurality of inverters are turned off, and all the lower arm transistors of the plurality of inverters are turned on. By so doing, when counter electromotive force is generated in any one of the three-phase alternating-current motors, only current resulting from the counter electromotive force generated in the any one of the three-phase alternating-current motors flows through the lower arm transistors and diodes of the inverter corresponding to the any one of the three-phase alternating-current motors while being substantially equally distributed. Thus, it is possible to prevent the upper arm transistors and lower arm transistors of the plurality of inverters from overheating because of current discharged from the smoothing capacitor and current resulting from the counter electromotive force, flowing at the same time. In addition, current resulting from counter electromotive force may be caused not to flow toward the smoothing capacitor, so it is possible to cause the smoothing capacitor not to store new electric charge. Furthermore, because the flow path of current resulting from the counter electromotive force is formed, the current flows through the phases of the three-phase alternating-current motor in which counter electromotive force is generated and the torque in the direction to stop the rotation is applied to the three-phase alternating-current motor, so it is possible to early decrease the rotation of the three-phase alternating-current motor to thereby stop generation of counter electromotive force. Then, in the vehicle according to this aspect, as the collision detecting unit has detected a collision, all the upper arm transistors of the plurality of inverters are turned off and all the lower arm transistors of the plurality of inverters are turned on, and then, when no counter electromotive force is generated in any one of the plurality of motors, an input voltage lower than the predetermined value is applied to at least any one of the upper arm transistors included in at least any one of the plurality of inverters, and at least any one of the lower arm transistors, which is serially connected to the at least any one of the upper arm transistors to which the input voltage lower than the predetermined value is applied is turned on. By so doing, it is possible to promptly discharge the electric charge stored in the smoothing capacitor while preventing large current from flowing through the at least any one of the upper arm transistors to which the input voltage lower than the predetermined value is applied and the at least any one of the lower arm transistors, which is serially connected to the at least any one of the upper arm transistors. As a result, in the vehicle according to this aspect, it is possible to promptly discharge the electric charge stored in the smoothing capacitor while further appropriately protecting the plurality of inverters and the plurality of three-phase alternating-current motors in the event of a collision.

A second aspect of the invention relates to a control method for a vehicle. The vehicle includes a three-phase alternating-current motor, an inverter that includes a plurality of upper arm transistors, each of which tends to reduce its resistance as an input voltage increases and turns on when an input voltage higher than a predetermined value is applied, a plurality of lower arm transistors, each of which is serially connected to a corresponding one of the upper arm transistors, and a plurality of diodes, each of which is connected in antiparallel with a corresponding one of the upper arm transistors and the lower arm transistors, an electrical storage unit that is able to exchange electric power with the three-phase alternating-current motor via the inverter, a smoothing capacitor that smoothes a voltage between the inverter and the electrical storage unit, and a collision detecting unit that detects a collision. The control method includes: turning off all the upper arm transistors of the inverter and turning on all the lower arm transistors of the inverter after the collision detecting unit has detected a collision; and when no counter electromotive force is generated in the three-phase alternating-current motor, applying an input voltage lower than the predetermined value to at least any one of the upper arm transistors of the inverter, and turning on at least any one of the lower arm transistors, which is serially connected to the at least any one of the upper arm transistors to which the input voltage lower than the predetermined value is applied.

According to the above aspects, it is possible to promptly discharge the electric charge stored in the smoothing capacitor while further appropriately protecting the inverter and the three-phase alternating-current motor in the event of a collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
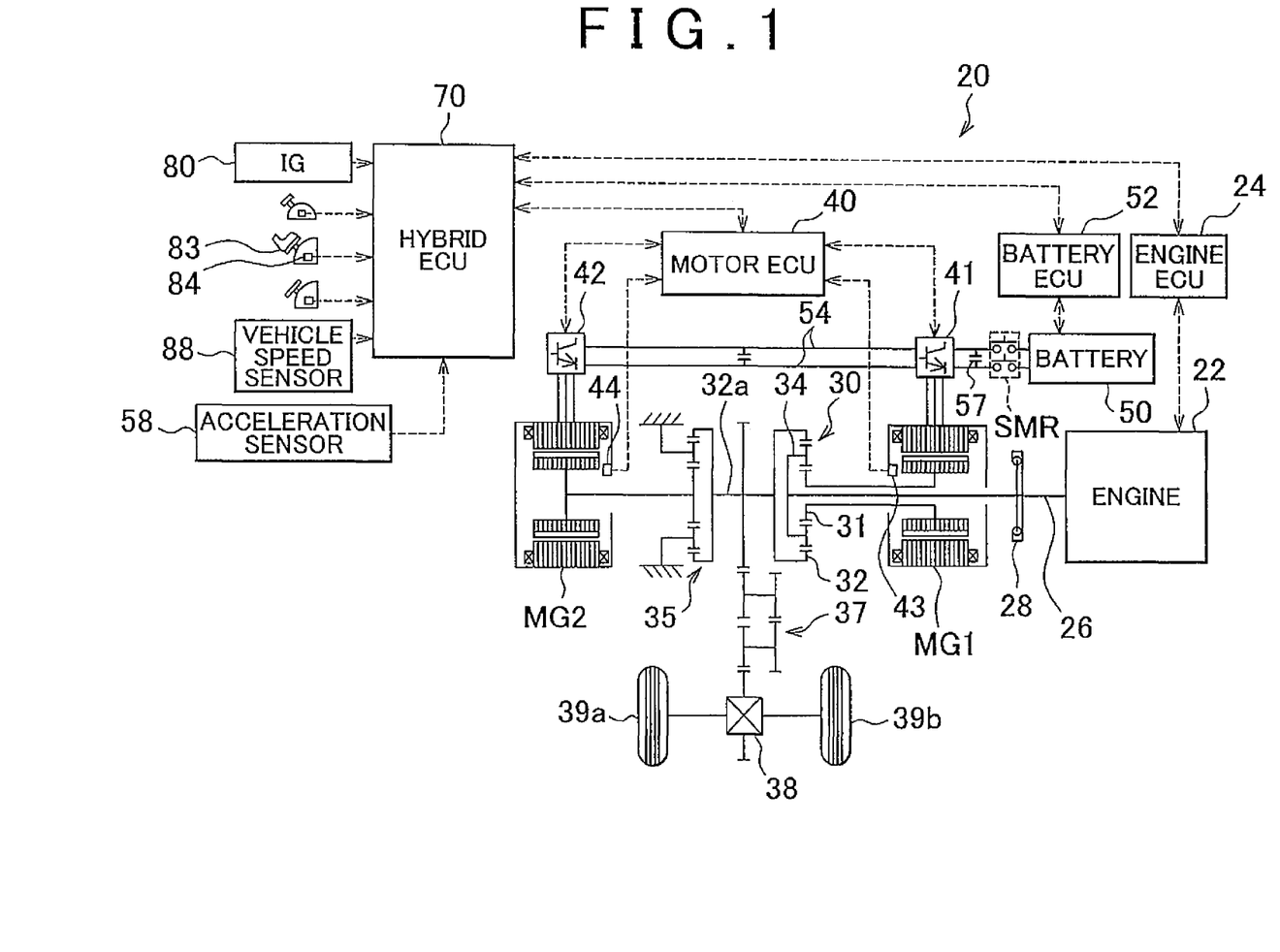
FIG. 1 is a schematic configuration diagram of a hybrid vehicle according to an embodiment of the invention.

FIG. 1 is a schematic configuration diagram of a hybrid vehicle 20 that serves as a vehicle according to an embodiment of the invention. The hybrid vehicle 20 according to the embodiment includes an engine 22, an engine electronic control unit (hereinafter, referred to as "engine ECU") 24, a planetary gear 30, a motor MG1, a reduction gear 35, a motor MG2, drive wheels 39a and 39b, a battery 50, an inverter 41, an inverter 42, a motor electronic control unit (hereinafter, referred to as "motor ECU") 40, a battery electronic control unit (hereinafter, referred to as "battery ECU") 52 and a hybrid electronic control unit (hereinafter, referred to as "hybrid ECU") 70. The engine 22 uses gasoline, light oil, or the like, as fuel. The engine ECU 24 executes drive control over the engine 22. A carrier 34 of the planetary gear 30 is connected to a crankshaft 26 via a damper 28. The crankshaft 26 serves as an output shaft of the engine 22. The motor MG1 is connected to a sun gear 31 of the planetary gear 30 and is able to generate electric power. The reduction gear 35 is coupled to a ring gear shaft 32a that is a drive shaft connected to a ring gear 32 of the planetary gear 30. The motor MG2 is connected to the reduction gear 35. The drive wheels 39a and 39b are connected to the ring gear shaft 32a via a gear mechanism 37 and a differential gear 38. The battery 50 is connected to an electric power line 54 via a system main relay SMR, and is, for example, a lithium ion secondary battery or a nickel metal hydride secondary, battery. The inverter 41 is interposed between the motor MG1 and the electric power line 54. The inverter 42 is interposed between the motor MG2 and the electric power line 54. The motor ECU 40 executes drive control over the motors MG1 and MG2 via the inverters 41 and 42. The battery ECU 52 manages the battery 50. The hybrid ECU 70 controls the vehicle overall while communicating with the engine ECU 24, the motor ECU 40, the battery ECU 52, and the like.

Figure 2:
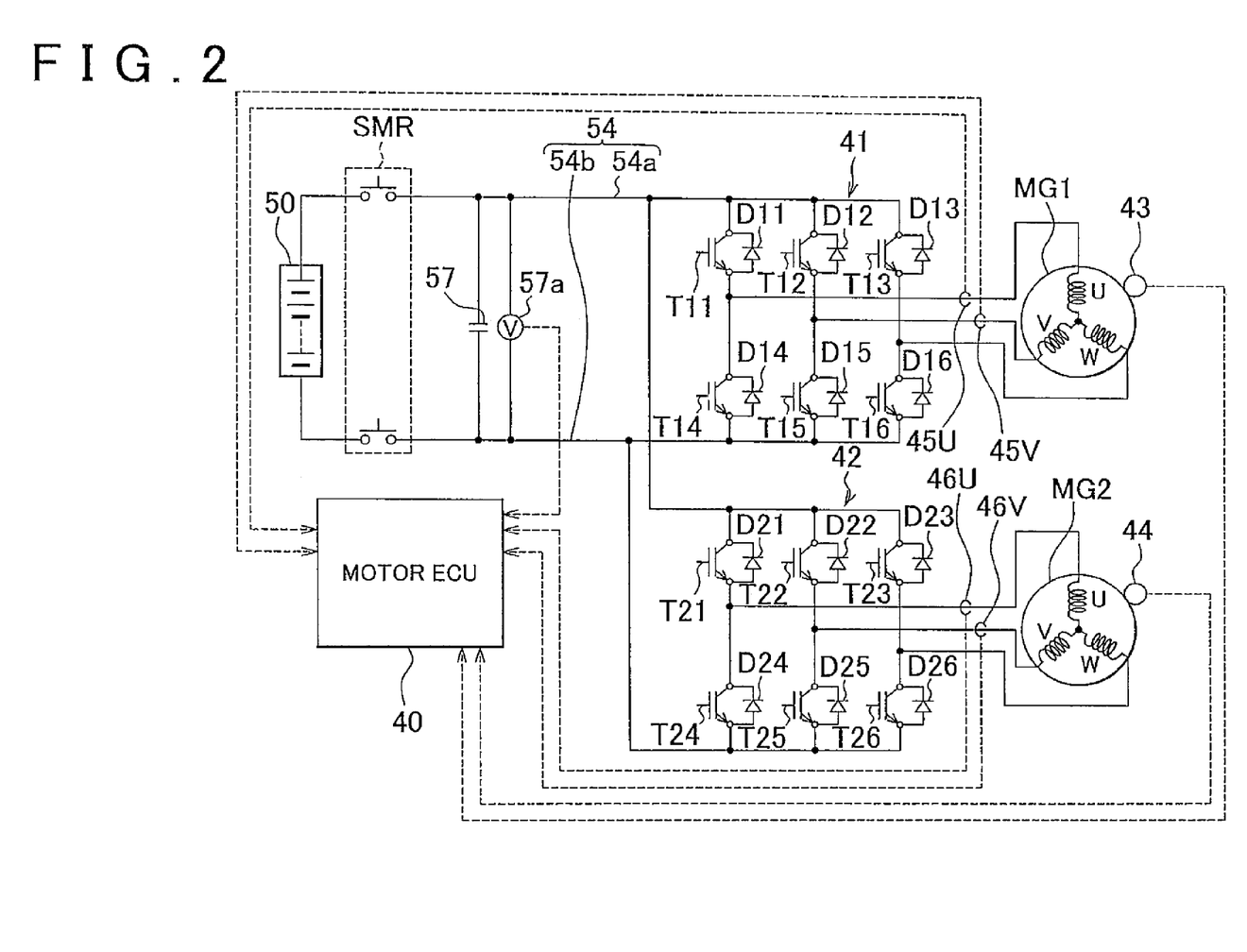
FIG. 2 is a schematic configuration diagram of an electrical drive system equipped for the hybrid vehicle according to the embodiment.

The motor MG1 and the motor MG2 each are configured as a known synchronous generator motor that includes a rotor in which a permanent magnet is embedded and a stator in which three phase coils are wound. As shown in FIG. 2, the inverter 41 is formed of six transistors T11 to T16 and six diodes D11 to D16 that are respectively connected in antiparallel with the transistors T11 to T16, and the inverter 42 is formed of six transistors T21 to T26 and six diodes D21 to D26 that are respectively connected in antiparallel with the transistors T21 to T26. Each of the transistors T11 to T16 and T21 to T26 tends to reduce its resistance as the gate voltage (input voltage) increases, and turns on when the gate voltage higher than or equal to a predetermined value V1 is applied. In addition, the transistors T11 to T16 and T21 to T26 are arranged in pairs so as to be a source side and a sink side with respect to a positive electrode bus 54a and a negative electrode bus 54b that are shared by the inverters 41 and 42 as the electric power line 54, three phase coils (U phase, V phase and W phase) of the motors MG1 and MG2 each are connected to a connecting point between a corresponding one of the pairs of transistors. Thus, the percentage of an ON time of each of the transistors T11 to T16 is controlled in a state where voltage is applied between the positive electrode bus 54a and the negative electrode bus 54b to thereby make it possible to form a revolving magnetic field in the three phase coils. Thus, it is possible to drive the motor MG1 for rotation. Similarly, the percentage of an ON time of each of the transistors T21 to T26 is controlled in a state where voltage is applied between the positive electrode bus 54a and the negative electrode bus 54b to thereby make it possible to form a revolving magnetic field in the three phase coils. Thus, it is possible to drive the motor MG2 for rotation. In addition, a smoothing capacitor 57 is connected between the positive electrode bus 54a and the negative electrode bus 54b at a position adjacent to the inverters 41 and 42 with respect to the system main relay SMR. The smoothing capacitor 57 smoothes voltage between the inverters 41 and 42 and the battery 50. Hereinafter, the three transistors T11 to T13 of the inverter 41 and the three transistors T21 to T23 of the inverter 42 are termed "upper arm transistors", and the three transistors T14 to T16 of the inverter 41, each of which is serially connected to a corresponding one of the upper arm transistors T11 to T13, and the three transistors T24 to T26 of the inverter 42, each of which is serially connected to a corresponding one of the upper arm transistors T21 to T23, are termed "lower arm transistors".

The inverter 41 is controlled by the motor ECU 40 to execute drive control over the motor MG1, and the inverter 42 is controlled by the motor ECU 40 to execute drive control over the motor MG2. A signal required to execute drive control over the motor MG1 is input to the motor ECU 40, and a signal required to execute drive control over the motor MG2 is input to the motor ECU 40. The signals, for example, include a signal from a rotational position detecting sensor 43 that detects the rotational position of a rotor of the motor MG1, a signal from a rotational position detecting sensor 44 that detects the rotational position of a rotor of the motor MG2, phase currents Iu1 and Iv1 from current sensors 45U and 45V that respectively detect phase currents flowing through the U phase and V phase of the three phase coils of the motor MG1, phase currents Iu2 and Iv2 from current sensors 46U and 46V that respectively detect phase currents flowing through the U phase and V phase of the three phase coils of the motor MG2, a voltage VH from a voltage sensor 57a that detects the voltage of the smoothing capacitor 57, and the like. In addition, switching control signals are output from the motor ECU 40 to the transistors T11 to T16 of the inverter 41 and the transistors T21 to T26 of the inverter 42. Then, the motor ECU 40 communicates with the hybrid ECU 70, executes drive control over the motors MG1 and MG2 by control signals from the hybrid ECU 70, and, where necessary, outputs data about the operating states of the motors MG1 and MG2 to the hybrid ECU 70. Note that the motor ECU 40 also computes the rotational speed Nm1 of the motor MG1 on the basis of the signal from the rotational position detecting sensor 43 and computes the rotational speed Nm2 of the motor MG2 on the basis of the signal from the rotational position detecting sensor 44.

When the thus configured hybrid vehicle 20 according to the embodiment is ready to run, the hybrid ECU 70 sets a required torque Tr on the basis of an accelerator operation amount Acc from an accelerator pedal position sensor 84 that detects the depression amount of an accelerator pedal 83 and a vehicle speed V from a vehicle speed sensor 88, generates command signals, such as a target rotational speed Ne and target torque Te of the engine 22, a torque command Tm1 of the motor MG1 and a torque command Tm2 of the motor MG2, on the basis of the set required torque Tr, and transmits the generated command signals to the engine ECU 24 and the motor ECU 40. In addition, the acceleration of the vehicle from an acceleration sensor 58 is input to the hybrid ECU 70. The acceleration sensor 58 serves as a collision detecting unit that is attached to a vehicle body (for example, the center portion, side portions, or the like, of the front of the vehicle). Then, the hybrid ECU 70, for example, determines that there occurs a collision of the vehicle when the input acceleration exceeds a collision determination threshold or a threshold for activating a safety device, such as an airbag, turns off the system main relay SMR to isolate the battery 50 from the electrical system of the vehicle in order to increase the safety of the vehicle in the event of a collision, and transmits a predetermined collision occurrence signal to the ECUs 24, 40, 52, and the like.

In the above hybrid vehicle 20, in the event of a collision, the electric charge stored in the smoothing capacitor 57 should be promptly discharged in order to early reduce the gate voltages of the inverters 41 and 42. Then, when the hybrid ECU 70 determines that there occurs a collision, the motor ECU 40 according to the embodiment controls at least any one of the inverters 41 and 42 in accordance with the following procedure to thereby discharge the electric charge stored in the smoothing capacitor 57.

Figure 3:
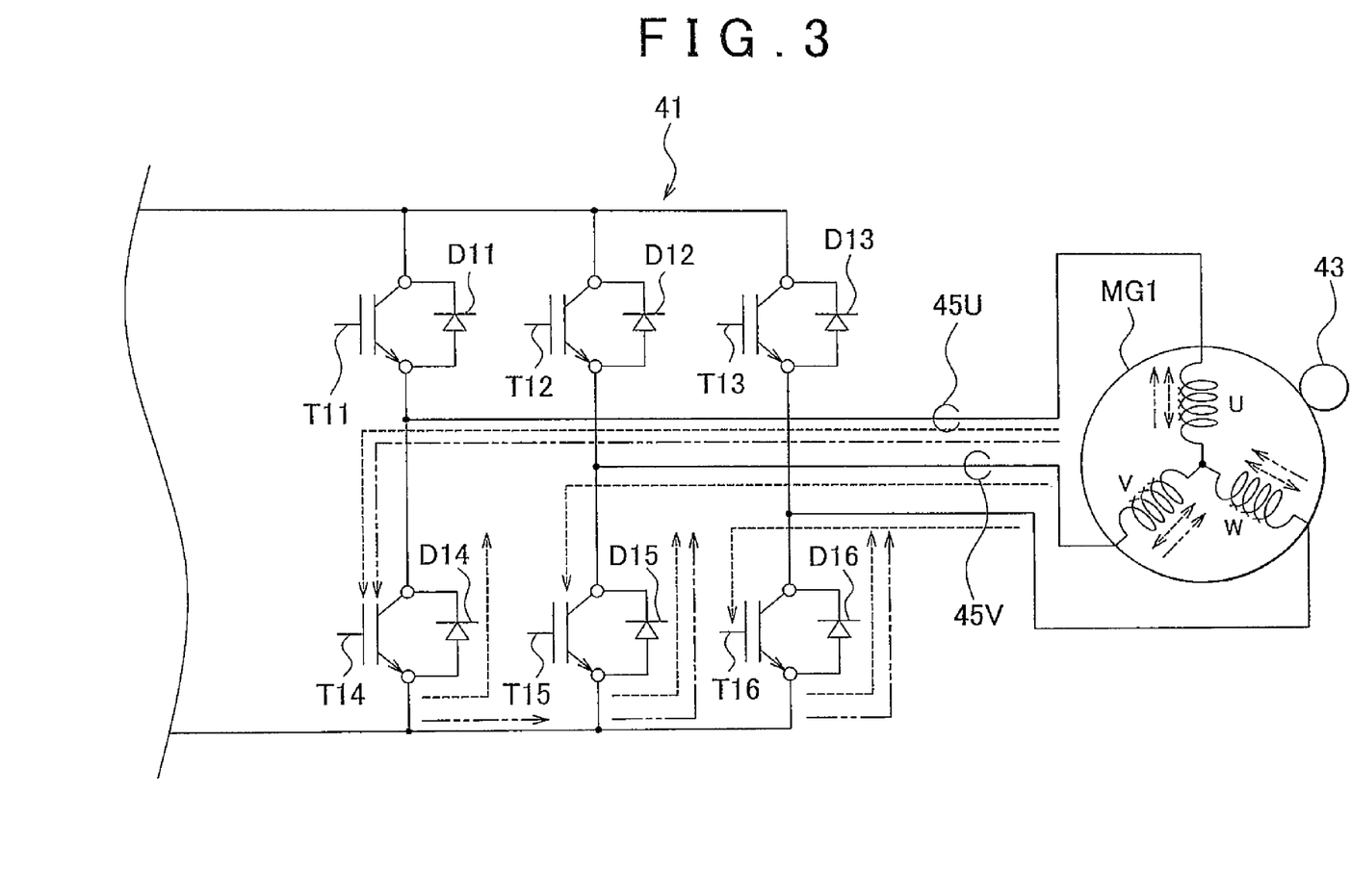
FIG. 3 is a view that illustrates an example of a path of current flowing through an inverter and a motor MG1 when counter electromotive force is generated in the motor MG1 according to the embodiment.

The motor ECU 40 according to the embodiment receives the collision occurrence signal from the hybrid ECU 70 as the hybrid ECU 70 determines that there occurs a collision of the vehicle. When the motor ECU 40 receives the signal, the motor ECU 40 turns off all the upper arm transistors T11 to T13 of the inverter 41 and the upper arm transistors T21 to T23 of the inverter 42 and turns on all the lower arm transistors T14 to T16 of the inverter 41 and the lower arm transistors T24 to T26 of the inverter 42, and then determines whether counter electromotive force is generated in any one of the motors MG1 and MG2 on the basis of the phase currents Iu1 and Iv1 of the motor MG1, detected by the current sensors 45U and 45V, and the phase currents Iu2 and Iv2 of the motor MG2, detected by the current sensors 46U and 46V. That is, when the right or left drive wheel 39b or 39a rotates at an idle in a state where the right or left drive wheel 39b or 39a is separated from a road surface after a collision of the hybrid vehicle 20 or when the hybrid vehicle 20 is not completely stopped because of an oblique collision, the motor MG1 or MG2 may continue rotating even after occurrence of a collision. In addition, even when rotation of the drive wheels 39a and 39b is stopped after occurrence of a collision, the motor MG1 may be forced by the engine 22 to continue rotating if the engine 22 is operating. Then, in such a case, when counter electromotive force is generated in any one of the motors MG1 and MG2 and then all the upper arm transistors T11 to T13 of the inverter 41 and all the upper arm transistors T21 to T23 of the inverter 42 are turned off and all the lower arm transistors T14 to T16 of the inverter 41 and all the lower arm transistors T24 to T26 of the inverter 42 are turned on, current resulting from the counter electromotive force flows through the phases of the motors MG1 and MG2 and the phases of the inverters 41 and 42 as indicated by the broken arrows in FIG. 3. Thus, by monitoring the phase currents Iu1, Iv1, Iu2 and Iv2, it is possible to determine whether counter electromotive force is generated in any one of the motors MG1 and MG2. Note that, instead of the phase currents Iu1, Iv1, Iu2 and Iv2, it may be determined on the basis of the rotational speeds Nm1 and Nm2 of the motors MG1 and MG2 whether counter electromotive force is generated in any one of the motors MG1 and MG2. In any cases, the motor ECU 40 according to the embodiment functions as a counter electromotive force generation determining unit that determines whether counter electromotive force is generated in any one of the motors MG1 and MG2.

When the motor ECU 40 determines that counter electromotive force is generated in at least any one of the motors MG1 and MG2 after occurrence of a collision, the motor ECU 40 continues to turn off all the upper arm transistors T11 to T13 of the inverter 41 and/or upper arm transistors T21 to T23 of the inverter 42, connected to the motors MG1 and/or MG2 in which counter electromotive force is generated, and to turn on all the lower arm transistors T14 to T16 of the inverter 41 and/or lower arm transistors T24 to T26 of the inverter 42, connected to the motors MG1 and/or MG2 in which counter electromotive force is generated. By so doing, for example, when counter electromotive force is generated in the motor MG1, current resulting from the counter electromotive force circulates between the inverter 41 and the motor MG1 while being substantially equally distributed among the lower arm transistors T14 to T16 and the diodes D14 to D16 of the inverter 41 as indicated by the broken arrows in FIG. 3. Here, in the case where all the upper arm transistors T11 to T13 of the inverter 41 are turned off and only the transistor T14 among the lower arm transistors is turned on when counter electromotive force is generated in the motor MG1, current resulting from the counter electromotive force of the motor MG1 all passes through the transistor T14 and then flows again to the motor MG1 via the diodes T15 and T16 as indicated by the alternate long and two short dashes line in FIG. 3, so there is a concern that current resulting from the counter electromotive force of the motor MG1 concentratively flows through the transistor T14 to adversely influence the transistor T14 and, in some cases, the transistor T14 breaks. In addition, in this case, half-wave current flows (only current in any one of positive and negative directions constantly flows) through the U, V and W phases of the motor MG1, so there is a concern that the permanent magnet of the motor MG1 is demagnetized. In contrast to this, as in the case of the hybrid vehicle 20 according to the present embodiment, for example, when it is determined that counter electromotive force is generated in the motor MG1 after occurrence of a collision, all the upper arm transistors T11 to T13 of the inverter 41 are turned off, and all the lower arm transistors T14 to T16 of the inverter 41 are turned on. This prevents current from concentratively flowing through any one of the lower arm transistors T14 to T16 to make it possible to protect the lower arm transistors T14 to T16, and stops half-wave current from flowing through the phases of the motor MG1 to make it possible to prevent demagnetization of the permanent magnet of the motor MG1. In addition, when all the upper arm transistors T11 to T13 of the inverter 41 are turned off and all the lower arm transistors T14 to T16 of the inverter 41 are turned on, current discharged from the smoothing capacitor 57 and current resulting from the counter electromotive force do not flow at the same time to thereby make it possible to prevent the transistors T11 to T16 of the inverter 41 from overheating. Note that when counter electromotive force is generated in any one of the motors MG1 and MG2, torque in the direction to stop the rotation is generated in the any one of the motors MG1 and MG2, so the rotation of the any one of the Motors MG1 and MG2 early decreases, and no counter electromotive force is generated at the stage at which the rotation has decreased to a certain degree.

Figure 4:
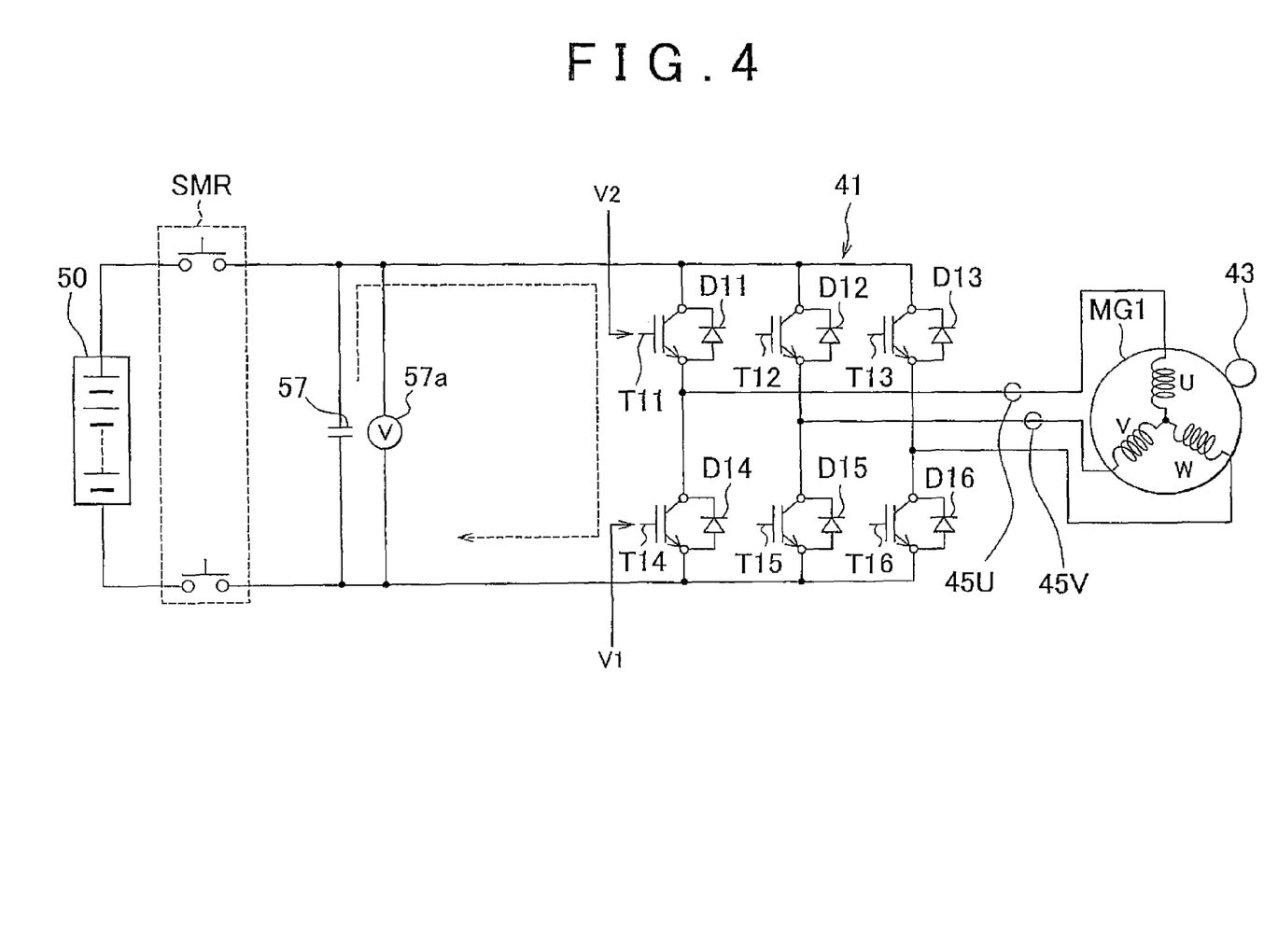
FIG. 4 is a view that illustrates an example of a path of current flowing from a smoothing capacitor to the inverter according to the embodiment.

Then, when the motor ECU 40 determines that no counter electromotive force is generated in any one of the motors MG1 and MG2 immediately after occurrence of a collision, or when counter electromotive force is generated in at least any one of the motors MG1 and MG2 immediately after occurrence of a collision but the rotation of the motors MG1 and/or MG2 decreases and then no counter electromotive force is generated, the motor ECU 40 applies a gate voltage V2 lower than the predetermined value V1 to at least any one of the upper arm transistors T11 to T13 of the inverter 41 and the upper arm transistors T21 to T23 of the inverter 42, and applies a gate voltage higher than or equal to the predetermined value V1 to at least any one of the lower arm transistors T14 to T16 of the inverter 41 and the lower arm transistors T24 to T26 of the inverter 42, which is serially connected to the at least any one of the upper arm transistors to which the gate voltage V2 is applied, to thereby completely turn on the at least any one of the lower arm transistors T14 to T16. For example, as shown in FIG. 4, when the gate voltage V2 is applied to the upper arm transistor T11 of the inverter 41 and the lower arm transistor T14 serially connected to the upper arm transistor T11 is completely turned on, the upper arm transistor T11 enters a so-called half-on state, so the resistance of the upper arm transistor T11 is larger than the resistance of the upper arm transistor T11, which is completely turned on, and a current that flows through the upper arm transistor T11 is smaller than a current that flows through the upper arm transistor T11 completely turned on. Then, when the upper arm transistor T11 is placed in a half-on state and the lower arm transistor T14 is completely turned on, current from the smoothing capacitor 57 flows through the upper arm transistor T11 and the lower arm transistor T14 as indicated by the broken arrow in FIG. 4. Thus, it is possible to cause, the smoothing capacitor 57 to promptly discharge while preventing large current from flowing through the upper arm transistor T11 and the lower arm transistor T14 owing to an increase in the resistance of the half-on upper arm transistor T11.

Note that, in the hybrid vehicle 20 according to the embodiment, the number of the half-on upper arm transistors of the inverters 41 and 42 is determined on the basis of the voltage VH of the smoothing capacitor 57 at the time when it is determined that no counter electromotive force is generated in any one of the motors MG1 and MG2 after occurrence of a collision. That is, when it is determined that no counter electromotive force is generated in any one of the motors MG1 and MG2 after occurrence of a collision, for example, any one of the upper arm transistors T11 to T13 of the inverter 41 and any one of the upper arm transistors T21 to T23 of the inverter 42 may be placed in a half-on state, all the upper arm transistors T11 to T13 of the inverter 41 or all the upper arm transistors T21 to T23 of the inverter 42 may be placed in a half-on state or all the upper arm transistors T11 to T13 of the inverter 41 and all the upper arm transistors T21 to T23 of the inverter 42 may be placed in a half-on state on the basis of the voltage VH of the smoothing capacitor 57. In addition, when it is determined that no counter electromotive force is generated in any one of the motors MG1 and MG2 after occurrence of a collision, the lower arm transistor(s) corresponding to the half-on upper arm transistor(s) just needs to be turned on; instead, all the lower arm transistors of the inverters 41 and/or 42 that include the half-on upper arm transistor(s) may be turned on.

As described above, in the hybrid vehicle 20 according to the embodiment, after the hybrid ECU 70 determines that there occurs a collision on the basis of the acceleration of the vehicle from the acceleration sensor 58, all the upper arm transistors T11 to T13 and/or T21 to T23 of the inverters 41 and/or 42 connected to the motors MG1 and/or MG2 in which counter electromotive force is generated are turned off and all the lower arm transistors T14 to T16 and/or T24 to T26 of the inverters 41 and/or 42 connected to the motors MG1 and/or MG2 in which counter electromotive force is generated are turned on. By so doing, current resulting from the counter electromotive force flows through the lower arm transistors T14 to T16 and/or T24 to T26 and the diodes D14 to D16 and/or D24 to D26 while being substantially equally distributed. Thus, current is prevented from concentratively flowing through any one of the lower arm transistors T14 to T16 and T24 to T26 to thereby make it possible to protect the lower arm transistors T14 to T16 and T24 to T26, and half-wave current is not caused to flow through the phases of the motor MG1 or MG2 to thereby make it possible to prevent demagnetization of the permanent magnets of the motors MG1 and MG2. In addition, when all the upper arm transistors T11 to T13 and/or T21 to T23 are turned off and all the lower arm transistors T14 to T16 and/or T24 to T26 are turned on, it is possible to prevent the upper arm transistors T11 to T13 and T21 to T23 and the lower arm transistors T14 to T16 and T24 to T26 of the inverters 41 and 42 from overheating because of current discharged from the smoothing capacitor 57 and current resulting from the counter electromotive force, flowing at the same time. Note that, when counter electromotive force is generated in any one of the motors MG1 and MG2, torque in the direction to stop the rotation is generated in the any one of the motors MG1 and MG2, so no counter electromotive force is generated at the stage at which the rotation of the any one of the motors. MG1 and MG2 has decreased to a certain degree because of the generated torque. In addition, when it is determined that no counter electromotive force is generated in any one of the motors MG1 and MG2 after it is determined that there occurs a collision and then all the upper arm transistors T11 to T13 and/or T21 to T23 of the inverters 41 and/or 42 connected to the motors MG1 and/or MG2 in which counter electromotive force is generated are turned off and all the lower arm transistors T14 to T16 and/or T24 to T26 of the inverters 41 and/or 42 connected to the motors MG1 and/or MG2 in which counter electromotive force is generated, the gate voltage V2 lower than the predetermined value V1 is applied to at least any one of the upper arm transistors T11 to T13 and T21 to T23 of the inverters 41 and 42, and at least any one of the lower arm transistors T14 to T16 and the T24 to T26, which is serially connected to the at least any one of the upper arm transistors to which the gate voltage V2 is applied, is turned on: In this way, the resistance of at least any one of the upper arm transistors T11 to T13 and T21 to T23 of the inverters 41 and 42, to which the gate voltage V2 lower than the predetermined value V1 is applied, is larger than the resistance of the at least any one of the upper arm transistors T11 to T13 and T21 to T23, which is completely turned on, and a current that flows through the at least any one of the upper arm transistors reduces. Thus, when at least any one of the lower arm transistors, corresponding to the at least any one of the upper arm transistors to which the gate voltage V2 lower than the predetermined value V1 is applied, is turned on, it is possible to promptly discharge the electric charge stored in the smoothing capacitor 57 while preventing large current from flowing through these upper arm transistor(s) and lower arm transistor(s). As a result, in the vehicle according to the present embodiment, it is possible to promptly discharge the electric charge stored in the smoothing capacitor 57 while further appropriately protecting the inverters 41 and 42 and the motors MG1 and MG2 in the event of a collision.

Figure 5:
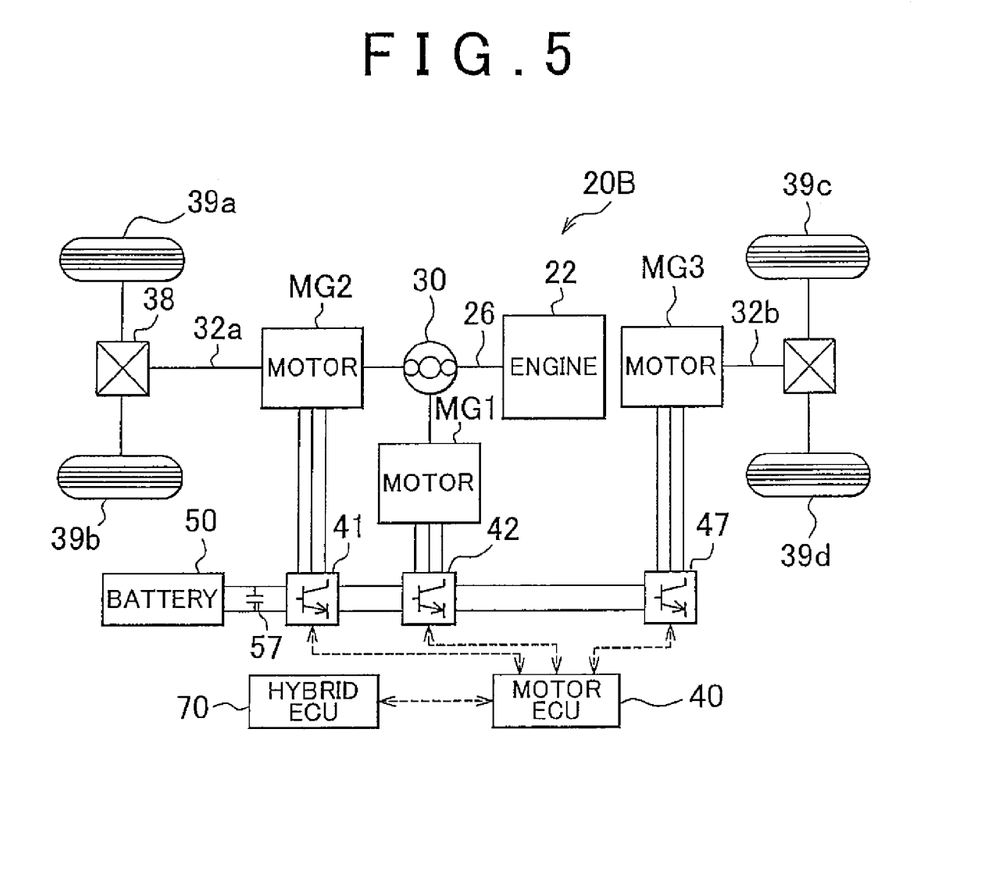
FIG. 5 is a schematic configuration diagram of a hybrid vehicle according to an alternative embodiment to the embodiment.

FIG. 5 is a schematic configuration diagram that shows a hybrid vehicle 20B according to an alternative embodiment to the present embodiment. Note that, in order to avoid overlap description, like reference numerals denote similar components of the hybrid vehicle 20B to those of the hybrid vehicle 20 according to the above described embodiment, and the illustration and detailed description are omitted. In addition, for the sake of easy description, the reduction gear 35, the gear mechanism 37, and the like, are not shown in FIG. 5. The hybrid vehicle 20B shown in the drawing includes, in addition to the components of the above described hybrid vehicle 20, for example, a motor MG3 and an inverter 47. The motor MG3 is configured as a synchronous generator motor and inputs or outputs power to or from a rear wheel-side drive shaft 32b that is coupled to rear wheels 39c and 39d. The inverter 47 is connected to the battery 50 via the smoothing capacitor 57 in parallel with the inverters 41 and 42, and drives the motor MG3. The inverter 47 has the same configuration as the configurations of the above described inverters 41 and 42. In the hybrid vehicle 20B that includes the plurality of motors MG1 to MG3 and the inverters 41, 42 and 47 in this way as well, when there occurs a collision of the vehicle, the electric charge stored in the smoothing capacitor 57 should be promptly discharged in order to early decrease the gate voltages of the inverters 41, 42 and 47. Therefore, in the hybrid vehicle 20B according to the alternative embodiment, when the motor ECU 40 receives a collision occurrence signal from the hybrid ECU 70 as the hybrid ECU 70 determines that there occurs a collision of the vehicle, the motor ECU 40 executes collision discharge control routine illustrated in FIG. 6.

Figure 6:
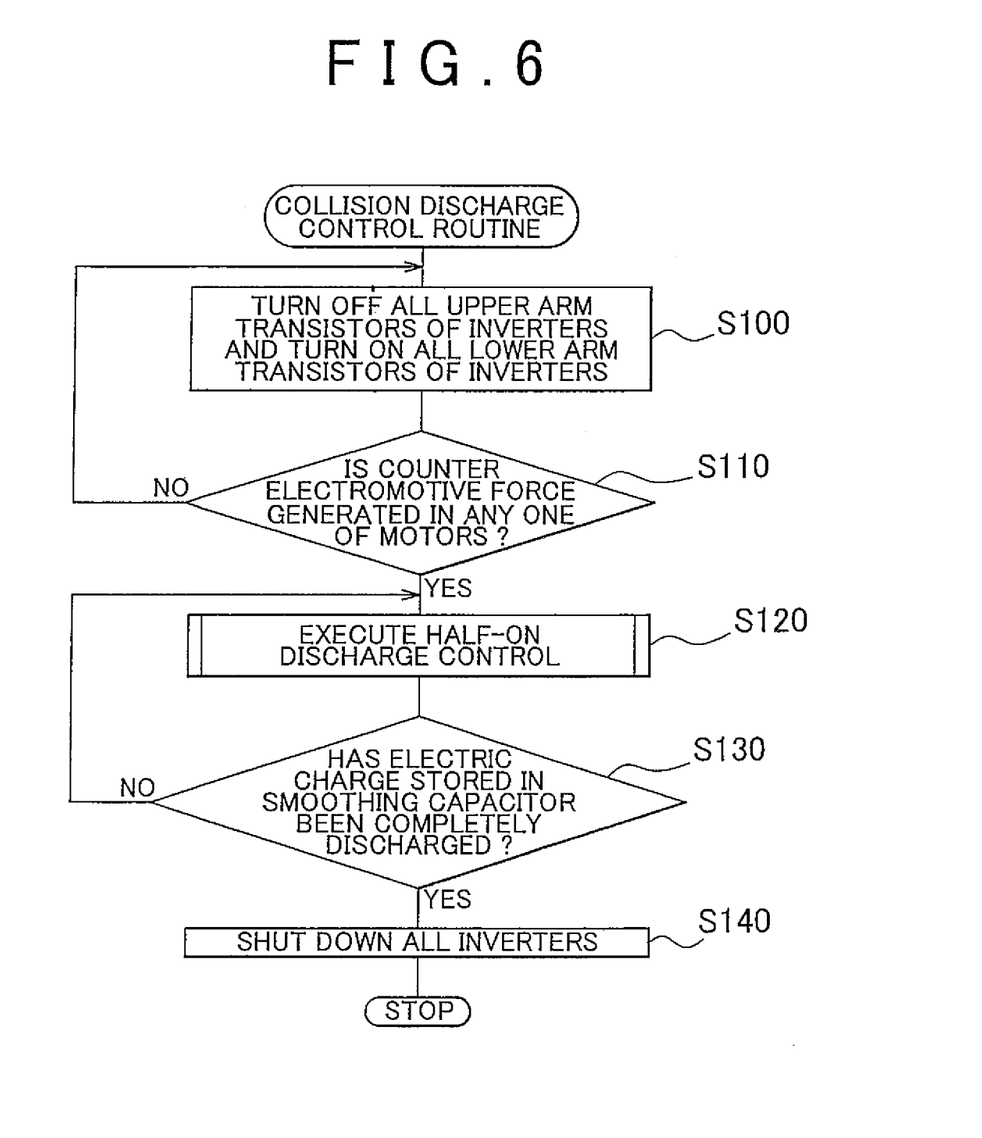
FIG. 6 is a flowchart that shows an example of collision discharge control routine executed by a motor ECU after a collision of a vehicle is detected in the hybrid vehicle according to the alternative embodiment to the embodiment.

When the collision discharge control routine is started, the motor ECU 40 initially turns off all the upper arm transistors of all the inverters 41, 42 and 47 and turns on all the lower arm transistors of all the inverters 41, 42 and 47 (S100 in FIG. 6). Subsequently, on the basis of the phase currents that flow through the phases of the motors MG1, MG2 and MG3, detected by current sensors (not shown), it is determined whether counter electromotive force is generated in any one of the motors MG1, MG2 and MG3 (S110 in FIG. 6). Then, when the motor ECU 40 determines that counter electromotive force is generated in any one of the motors MG1, MG2 and MG3 after a collision is detected, the motor ECU 40 at least continues to turn off all the upper arm transistors of the inverter connected to the any one of the motors MG1, MG2 and MG3 in which counter electromotive force is generated and continues to turn on all the lower arm transistors of that inverter.

On the other hand, when the motor ECU 40 determines that no counter electromotive force is generated in any one of the motors MG1, MG2 and MG3 after a collision is detected, or when counter electromotive force is generated in any one of the motors MG1, MG2 and MG3 after a collision is detected but the rotation of that motor has decreased and then no counter electromotive force is generated, the motor ECU 40 executes half-on discharge control in which the gate voltage V2 lower than the predetermined value V1 is applied to at least any one of the upper arm transistors included in at least any one of the inverters 41, 42 and 47 and a gate voltage higher than the predetermined value V1 is applied to at least any one of the lower arm transistors, which is serially connected to the at least any one of the upper arm transistors to which the gate voltage V2 is applied, to completely turn on the at least any one of the lower arm transistors (S120 in FIG. 6). By so doing, the at least any one of the upper arm transistors to which the gate voltage V2 is applied is placed in a so-called half-on state, so the resistance of the at least any one of the upper arm transistors is larger than the resistance of the at least any one of the upper arm transistors, which is completely turned on, and a current that flows through the at least any one of the upper arm transistors is smaller than a current that flows through the at least any one of the upper arm transistors, completely turned on. Then, the target upper arm transistor(s) is placed in a half-on state and the target lower arm transistor(s) is completely turned on. By so doing, current from the smoothing capacitor 57 flows through those upper arm transistor(s) and lower arm transistor(s). Thus, it is possible to cause the smoothing capacitor 57 to promptly discharge while preventing large current from flowing through the upper arm transistor(s) and the lower arm transistor(s) owing to an increase in the resistance of the half-on upper arm transistor(s).

After the motor ECU 40 starts half-on discharge control, the motor ECU 40 determines whether the electric charge stored in the smoothing capacitor 57 has been completely discharged on the basis of the voltage VH, which is the voltage between the terminals of the smoothing capacitor 57, detected by a voltage sensor (not shown) (S130 in FIG. 6), and, when it is determined that the electric charge stored in the smoothing capacitor 57 has not been completed, the motor ECU 40 continues the above half-on discharge control. Then, when it is determined that the electric charge stored in the smoothing capacitor 57 has been completely discharged, all the inverters are shut down (S140 in FIG. 6), and the routine ends. Note that, in S120 of FIG. 6, the number of inverters that include a half-on upper arm transistor or the number of half-on upper arm transistors in that inverter may be selectively determined.

As described above, in the hybrid vehicle 20B according to the alternative embodiment, after the hybrid ECU 70 determines that there occurs a collision on the basis of the acceleration of the vehicle from the acceleration sensor 58, all the upper arm transistors of all the inverters 41, 42 and 47 are turned off, and all the lower arm transistors of all the inverters 41, 42 and 47 are turned on. By so doing, when counter electromotive force is generated in any one of the motors MG1, MG2 and MG3, only current resulting from the counter electromotive force generated in the any one of the motors flows through the lower arm transistors and diodes of the inverter corresponding to that motor while being substantially equally distributed. Thus, it is possible to prevent the upper arm transistors and lower arm transistors of the plurality of inverters 41, 42 and 47 from overheating because of current discharged from the smoothing capacitor 57 and current resulting from the counter electromotive force, flowing at the same time. In addition, current resulting from the counter electromotive force may be caused not to flow toward the smoothing capacitor 57, so it is possible to cause the smoothing capacitor 57 not to store new electric charge. Furthermore, because the flow path of current resulting from the counter electromotive force is formed, the current flows through the phases of the motor in which counter electromotive force is generated and the torque in the direction to stop the rotation is applied to the motor, so it is possible to early decrease the rotation of the motor to stop generation of counter electromotive force. Then, in the hybrid vehicle 20B, all the upper arm transistors of all the inverters 41, 42 and 47 are turned off as the hybrid ECU 70 detects a collision. Then, all the lower arm transistors of all the inverters 41, 42 and 47 are turned on. After that, when no counter electromotive force is generated in any one of the motors MG1, MG2 and MG3, the gate voltage V2 lower than the predetermined value V1 is applied to at least any one of the upper arm transistors included in at least any one of the inverters 41, 42 and 47. Then, at least any one of the lower arm transistors, which is serially connected to the at least any one of the upper arm transistors to which the gate voltage V2 is applied, is turned on. By so doing, it is possible to promptly discharge the electric charge stored in the smoothing capacitor 57 while preventing large current from flowing through the at least any one of the upper arm transistors to which the gate voltage V2 lower than the predetermined value V1 is applied and the at least any one of the lower arm transistors, which is serially connected to the at least any one of the upper arm transistors. As a result, in the hybrid vehicle 20B according to the alternative embodiment, it is possible to promptly discharge the electric charge stored in the smoothing capacitor 57 while appropriately protecting the inverters 41, 42 and 47 and the plurality of motors MG1, MG2 and MG3 in the event of a collision.

Note that the aspect of the invention is described by taking the hybrid vehicle 20 or 20B that includes the plurality of motors MG1, MG2, and the like; however, of course, the aspect of the invention may be applied to a hybrid vehicle that includes a single electric motor that is able to input or output power or an electric vehicle that includes a single or plurality of electric motors that are able to input or output power.

A mode for carrying out the aspect of the invention is described using the embodiments; however, the aspect of the invention is not limited to such embodiments. The aspect of the invention may be implemented in various forms without departing from the scope of the invention.

The invention claimed is:

1. A vehicle comprising:
a three-phase alternating-current motor;
an inverter that includes a plurality of upper arm transistors, each of which tends to reduce its resistance as an input voltage increases and turns on when an input voltage higher than a predetermined value is applied, a plurality of lower arm transistors, each of which is serially connected to a corresponding one of the upper arm transistors, and a plurality of diodes, each of which is connected in antiparallel with a corresponding one of the upper arm transistors and the lower arm transistors;
an electrical storage unit that is able to exchange electric power with the three-phase alternating-current motor via the inverter;
a smoothing capacitor that smoothes a voltage between the inverter and the electrical storage unit;
a control unit that controls the inverter; and
a collision detecting unit that detects a collision, wherein
the control unit turns off all the upper arm transistors of the inverter and turns on all the lower arm transistors of the inverter after the collision detecting unit has detected a collision, and then, when no counter electromotive force is generated in the three-phase alternating-current motor, the control unit applies an input voltage lower than the predetermined value to at least any one of the upper arm transistors of the inverter, and turns on at least any one of the lower arm transistors, which is serially connected to the at least any one of the upper arm transistors to which the input voltage lower than the predetermined value is applied.

2. The vehicle according to claim 1, wherein
the vehicle includes a plurality of the three-phase alternating-current motors and a plurality of the inverters, and
the control unit turns off all the upper arm transistors of the plurality of inverters and turns on all the lower arm transistors of the plurality of inverters after the collision detecting unit has detected a collision, and then, when no counter electromotive force is generated in any one of the plurality of three-phase alternating-current motors, the control unit applies an input voltage lower than the predetermined value to at least any one of the upper arm transistors included in at least any one of the plurality of inverters and turns on at least any one of the lower arm transistors, which is serially connected to the at least any one of the upper arm transistors to which the input voltage lower than the predetermined value is applied.

3. A control method for a vehicle that includes a three-phase alternating-current motor, an inverter that includes a plurality of upper arm transistors, each of which tends to reduce its resistance as an input voltage increases and turns on when an input voltage higher than a predetermined value is applied, a plurality of lower arm transistors, each of which is serially connected to a corresponding one of the upper arm transistors, and a plurality of diodes, each of which is connected in antiparallel with a corresponding one of the upper arm transistors and the lower arm transistors, an electrical storage unit that is able to exchange electric power with the three-phase alternating-current motor via the inverter, a smoothing capacitor that smoothes a voltage between the inverter and the electrical storage unit, and a collision detecting unit that detects a collision, the control method comprising:
turning off all the upper arm transistors of the inverter and turning on all the lower arm transistors of the inverter after the collision detecting unit has detected a collision; and
when no counter electromotive force is generated in the three-phase alternating-current motor, applying an input voltage lower than the predetermined value to at least any one of the upper arm transistors of the inverter, and turning on at least any one of the lower arm transistors, which is serially connected to the at least any one of the upper arm transistors to which the input voltage lower than the predetermined value is applied.

* * * * *